May 25, 1965     I. M. RICE     3,185,437
NON-CORROSIVE VALVE
Filed Nov. 30, 1962
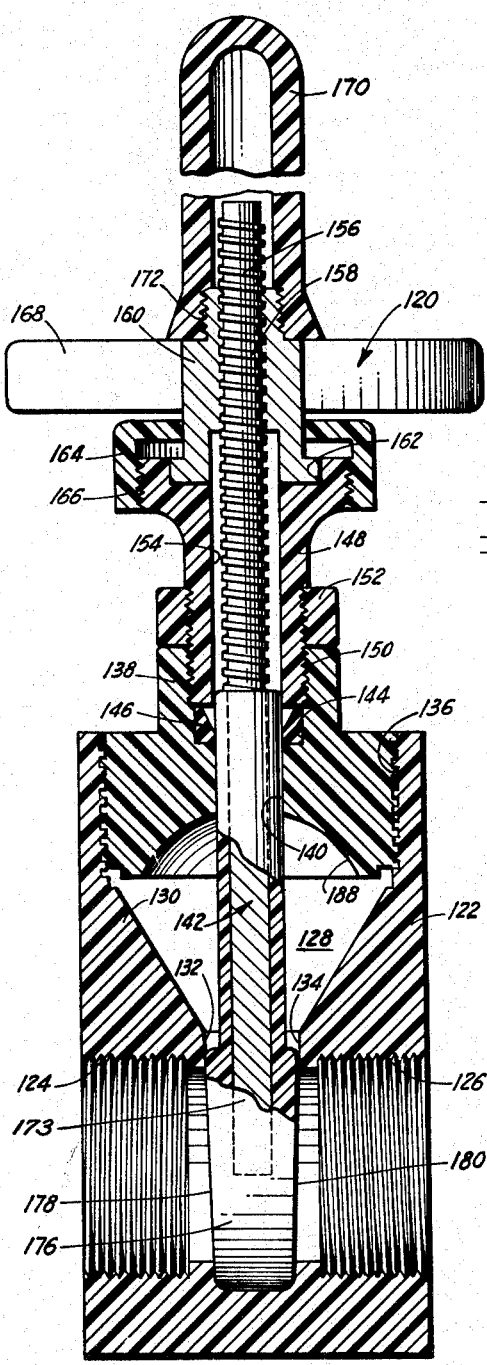
Fig. 1
Fig. 3
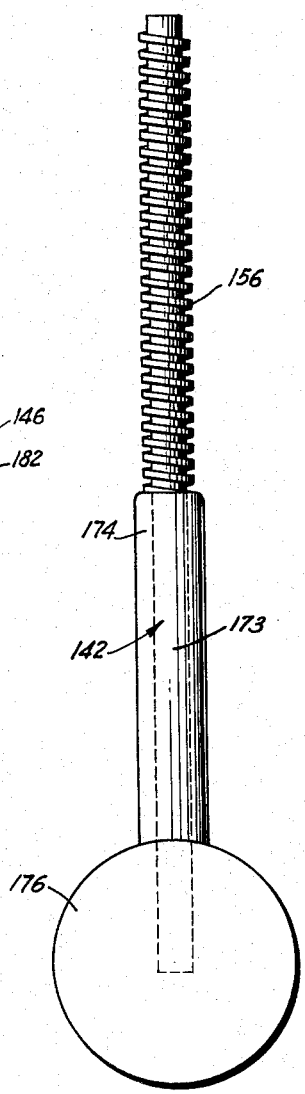
Fig. 2
INVENTOR.
Ivan M. Rice
BY
William S. Dorman
ATTORNEY

United States Patent Office 3,185,437
Patented May 25, 1965

3,185,437
NON-CORROSIVE VALVE
Ivan M. Rice, Great Bend, Kans., assignor to Rice Engineering & Operating, Inc., Great Bend, Kans., a corporation of Kansas
Filed Nov. 30, 1962, Ser. No. 241,400
1 Claim. (Cl. 251—327)

This application is a continuation-in-part of my copending application, Serial No. 844,468, filed October 5, 1959, now abandoned, and entitled "Valves."

This invention relates to improvements in valves and more particularly, but not by way of limitation, to valves which resist electrolytic deterioration of connected metallic pipe sections and which are resistant to the corrosive effects of fluids moving therethrough.

Many valves available today are constructed with bodies of cast iron or steel and are interposed in pipe lines transporting extremely corrosive fluids such as petroleum products or the like. The flow line with which these valves are used is frequently disposed beneath the surface of the ground and the metallic bodies are subject to rapid deterioration or corrosion from both the electrolytic action of elements which may be present in the surrounding soil and also the chemical action of the fluids moving therethrough. This internal deterioration may cause the valve bodies to leak and thus require replacement after relatively short periods of use and the longevity of the valve may also be lessened by the corrosive effect of certain chemicals in the earth encompassing the valve. For example, it is well known that earths of particularly high acidity may quickly damage a valve disposed therein.

In addition, valves interposed in pipe lines or flow lines disposed above the ground are also subject to destructive effects of the elements, such as rain, standing water or the abrasive effects of wind storms, and the like. It will be apparent that frequent maintenance of the valve is necessary in order to insure an efficient operation thereof as well as to provide a maximum life for the valve.

As hereinbefore set forth, valves are also utilized in many industries wherein the products passing therethrough inflicts internal damage from the corrosive action between the fluid and the valve body. Many times this internal corrosive effect is so severe that a valve, though it may appear in serviceable condition externally, may have deteriorated internally to the extent that it is no longer usable or repairable. This is a particular disadvantage in the petroleum industries, for example, wherein high combustible material or its products flowing through a defective valve may be ignited.

In an effort to combat the corrosive effects from both the fluid flowing through a pipe line and associated valves as well as the electrolytic action of the materials surrounding a buried pipe line, both plastics and asbestos type pipes have been utilized. As a general rule, the plastic pipe is available in relatively smaller size diameters and the asbestos type pipe is available in relatively larger sizes. For example, the asbestos pipes are not available in sizes smaller than three inch diameters wherein the plastic pipe is available in much smaller diameter sizes. As a result, the pipe lines of smaller diameters now generally use metallic valves for connecting sections of the plastic pipe to provide the desired pipe line. It will be apparent that the metallic valves are not desirable in many applications because of their high rate of heat conductivity as well as comparatively rapid corrosive deterioration thereof.

The present invention contemplates a novel gate valve having a gate or closure member adapted to wedge between the inlet and outlet apertures of the valve body in the closed position thereof for efficiently precluding leakage through the valve. The valve body and gate member are constructed from a material which resists the corrosive action of chemicals or fluids and is not subject to corrosion or deterioration due to electrolytic action. In addition, the material from which the valve body and associated members is constructed for a non-conductor with respect to transfer of heat in the invention broadly relates to a non corrosive valve and more particularly, to a valve constructed of asbestos material for utilization with larger pipe lines and a valve of a suitable plastic material for utilization with the smaller pipe lines.

It is an important object of this invention to provide a valve having characteristics of non-conductivity of electricity whereby electrolytic deterioration of the valve may be prevented.

Another object of this invention is to provide a novel valve having characteristics resistant to corrosive deterioration from fluids moving therethrough.

Still another object of this invention is to provide a novel non-corrosive valve having a self sealing closure member wherein auxiliary sealing rings are eliminated.

A still further object of this invention is to provide a novel non-corrosive valve which is simple and efficient in operation and economical and durable in construction.

Other objects and advantages of the invention will be evident from the following detailed description, read in conjunction with the accompanying drawings, which illustrate my invention.

In the drawings:

FIGURE 1 is a sectional elevational view of a valve embodying the invention and depicting the valve in a closed position.

FIGURE 2 is a side elevational view of the closure member and valve stem of the valve depicted in FIGURE 1.

FIGURE 3 is a sectional elevational view of a packing member utilized with the valve depicted in FIGURE 1.

Referring to the drawings in detail, reference character 120 generally indicates a gate valve comprising a body portion 122 constructed of a suitable plastic material such as that sold under the trade name Hycar, but not limited thereto, which is oil resistant or corrosive resistant to fluids normally passing through a pipe line. This type of material is widely used in the construction that is known as plastic pipe lines, particularly in the petroleum industry. The particular material from which the body 122 is constructed is substantially rigid and provides an efficient and strong valve structure. The body 122 may be of substantially any desired configuration, such as rectangular, circular or the like and is provided with aligned oppositely disposed threaded bores 124 and 126 forming inlet and outlet ports for providing a flow passageway through the body. An internal chamber 128 is provided in the body and as shown herein is provided with tapered or converging side walls 130 terminating in oppositely disposed valve seating portions 132 and 134. The valve seating portions 132 and 134 are concentric with the bores 124 and 126, respectively.

A threaded bore 136 is provided in the upper portions of the body 122 to permit access to the chamber 128 and threadedly receives cap member 138. The cap member 138 is provided with a central bore 140 extending therethrough for receiving a valve stem 142 which is preferably provided with a sealing ring (not shown) interposed between the cap member 138 and the body 122 to preclude leakage of fluid therebetween. The bore 140 is enlarged at 144 to receive a packing member 146. The packing member 146 is disposed around the valve stem 142 for precluding leakage of fluid therearound and a follower sleeve or member 148 is threadedly secured at 150 in the enlarged bore 144 for bearing against the packing member 146 for a purpose as will be hereinafter set forth. A suitable lock nut or ring 152 is threadedly secured around the outer periphery of the follower member 148 for facilitating the operation of the follower member 148 as is well known. The follower sleeve 148 is provided with a longitudinally extending central bore 154 for receiving the upper threaded portion 156 of the valve stem 142 therethrough. The threaded portion 156 is preferably of a metallic construction and extends through a threaded bore 158 of a metallic bushing 160. The bushing 160 is disposed in an annular groove 162 provided in the upper end of the follower member 148 and is secured therein by a suitable cap member 164 which is threadedly engaged at 166 with the follower 148. A wheel member 168 is disposed around the outer periphery of the bushing 160 and is secured thereto in any suitable manner (not shown) whereby rotation of the handle or wheel 168 is transmitted to the bushing 160. A dust protector cover or cap member 170 is threadedly secured at 172 to the upper end of the bushing 160 for protection of the upper portion or threaded portion 156 of the stem 142 during reciliation thereof upon opening and closing of the valve 132. The dust protector 170 may be constructed from a suitable transparent material, if desired, in order to permit visual inspection to determine the position of the valve stem 142 in order to determine whether the valve is opened or closed.

The valve stem 142 comprises the upper threaded portion 156 which is preferably of a metallic construction as hereinbefore set forth and is provided with a longitudinally extending reduced portion 173 shown in dotted lines in FIGURE 2. The portion 173 is encased in an outer sleeve 174 constructed of a suitable plastic material, such as that from which the body 122 is constructed. A gate or closure member 176 is integral with the outer covering 174 and surrounds the outer extremity of the member 172 as clearly shown in FIGURES 1 and 2. The gate member 176 is preferably constructed of a similar plastic material to that of the body 122 and covering 174. However, the physical characteristics of the gate material are such that the gate is sufficiently resilient to provide a self-sealing action against the valve seats 132 and 134 as will be hereinafter set forth in detail.

The valve stem 142 and closure member 176 is an integral unit by virtue of the fact that the covering 174 and gate member 178 are bonded to the outer periphery of the valve stem portion 173. The integral unit thus formed is preferably constructed by a well known molding operation wherein the covering 174 and gate member 176 are bonded to the portion 172 in a single operation. The material 174 is a hardfaced material whereas the gate material is resilient.

As shown herein the gate member is of a circular configuration but there is no intention to limit the invention to this particular showing. The opposed faces 178 and 180 of the gate member are tapered downwardly as shown in FIGURE 1 to provide a substantially wedged shaped cross sectional configuration for the gate member 176. The valve seating portions 132 and 134 are canted or inclined to substantially conform with the tapered or wedged shaped configuration of the gate member as clearly shown in FIGURE 1 and for a purpose as will be hereinafter set forth.

The packing ring 146 is of a particular construction for use with a non-corrosive valve of the type disclosed herein. The packing member 146 comprises a substantially annular body portion 182 having a central bore 184 in communication with a flared portion 186. The flared portion extends through a distance defined by X in FIGURE 3 and the straight portion 184 extends through a length as defined by Y. The packing ring 146 is fabricated by a molding operation wherein the portion X thereof is made from the hard faced plastic material and the portion Y is made from the resilient type plastic material, such as that of the gate member 176. The resulting packing ring 146 is a unitary structure wherein the portion Y, being resilient, provides a sealing ring portion for precluding leakage of fluid around the stem 142 and the portion X thereof functions as an integral follower ring or retaining member, thus the packing 146 is an integral unit comprising a sealing member and self contained retaining ring.

The body 122, cap member 138, lock nut 152, follower 148, cap 162 and dust protector 170 are preferably fabricated from a hard faced plastic material. Of course as hereinbefore set forth the dust protector 170 may be constructed from a suitable transparent material instead of the hard faced plastic material if desired. Thus, all portions of the valve 120 which are exposed to corrosive elements are constructed of the plastic material.

In operation of the valve 120 rotation of the wheel 168 in one direction causes the valve stem 142 to rise for moving the gate member 176 away from the valve seats 132 and 134 thus opening the ports 124 and 126 for flow of fluid through the valve. The cap member 138 may be provided with an arcuate recess 188 concentric with the bore 140 to provide clearance for the gate member 176 in order to assure a full opening of the valve 120 when the gate is in the uppermost position (not shown).

Rotation of the wheel 168 in an opposite direction causes the valve stem 142 to move downwardly for bringing the gate member 176 into engagement with the valve seats 132 and 134. The resilient characteristics of the gate member 176 cooperates with the valve seating members 132 and 134 for efficiently sealing the valve without the necessity of additional sealing rings and the like. The wedge shaped configuration of the gate member 176 and complementary inclined configuration of the valve seats 132 and 134 enhances the sealing qualities of the gate member 176.

The valve 120 may be constructed in relatively small sizes for installation in plastic pipe lines of relative small diameters thus eliminating the necessity of utilizing metallic valves with these plastic pipe lines. Although the valve depicted herein in both embodiments is a gate valve, it is to be understood that many types of valve bodies and valve closure members may be constructed from the asbestos-cement material and the plastic material to provide more efficient and economical valves for a large variety of uses.

From the foregoing, it will be apparent that the present invention provides a non-corrosive valve which is a non-conductor of electricity thereby precluding electrolytic deterioration of both itself and any metallic pipe sections to which it may be connected. In addition, the novel valve is not subject to chemical corrosion either internally or externally and the novel gate construction substantially reduces the transfer of heat from the inlet side of the valve to the outlet side and the novel construction of the valve body itself materially aids in the reduction of heat transfer thus providing a valve of great utility in applications which are subject to extreme temperatures. Furthermore, the novel resilient gate construction eliminates the necessity of additional sealing rings and the inherent disadvantages thereof.

Changes may be made in the combination and arrangement of parts as heretofore set forth in the specification and shown in the drawings, it being understood that any modification in the precise embodiment of the invention may be made within the scope of the following claim without departing from the spirit of the invention.

What is claimed is:

A gate valve comprising a body constructed of a non-corrosive plastic material and having opposed inlet and outlet ports, a cover member constructed of a non-corrosive material provided for the body, a reciprocal valve stem journalled in the cover and extending into the body, a valve seat provided conterminous with each of the inlet and outlet bores, the plane of said valve seats being inclined with respect to the vertical, a substantially wedged shaped closure member bonded to the outer extremity of the valve stem disposed within the body and movable with the valve stem to provide alternate open and closed positions for the valve, threaded means cooperating with the valve stem for reciprocation thereof for moving the closure member alternately into and out of engagement with the valve seating portions, said closure member being constructed of a resilient non-corrosive plastic material to provide a self-sealing against the valve seating portions in the closed position of the closure member, and a non-corrosive coating of hard faced plastic material bonded to the outer periphery of the valve stem between the threaded means and the closure member and integral with the closure member.

References Cited by the Examiner

UNITED STATES PATENTS

| | | | |
|---|---|---|---|
| 397,757 | 2/89 | Seaver | 251—328 |
| 713,851 | 11/02 | Cash | 251—327 X |
| 880,463 | 2/08 | Paul | 251—328 |
| 2,755,118 | 7/56 | Jarvis | 277—227 |
| 2,790,661 | 4/57 | Tamminga | 277—227 |
| 2,951,721 | 9/60 | Asp | 277—227 |
| 2,967,539 | 1/61 | Bradbury | 251—368 |
| 2,973,183 | 2/61 | Alger | 251—368 X |
| 3,004,783 | 10/61 | Webb | 277—227 X |
| 3,006,597 | 10/61 | Hookway | 251—327 |
| 3,026,899 | 3/62 | Mischanski | 251—368 |

M. CARY NELSON, *Primary Examiner.*

LAVERNE D. GEIGER, MARTIN P. SCHWADRON,
*Examiners.*